Patented July 27, 1943

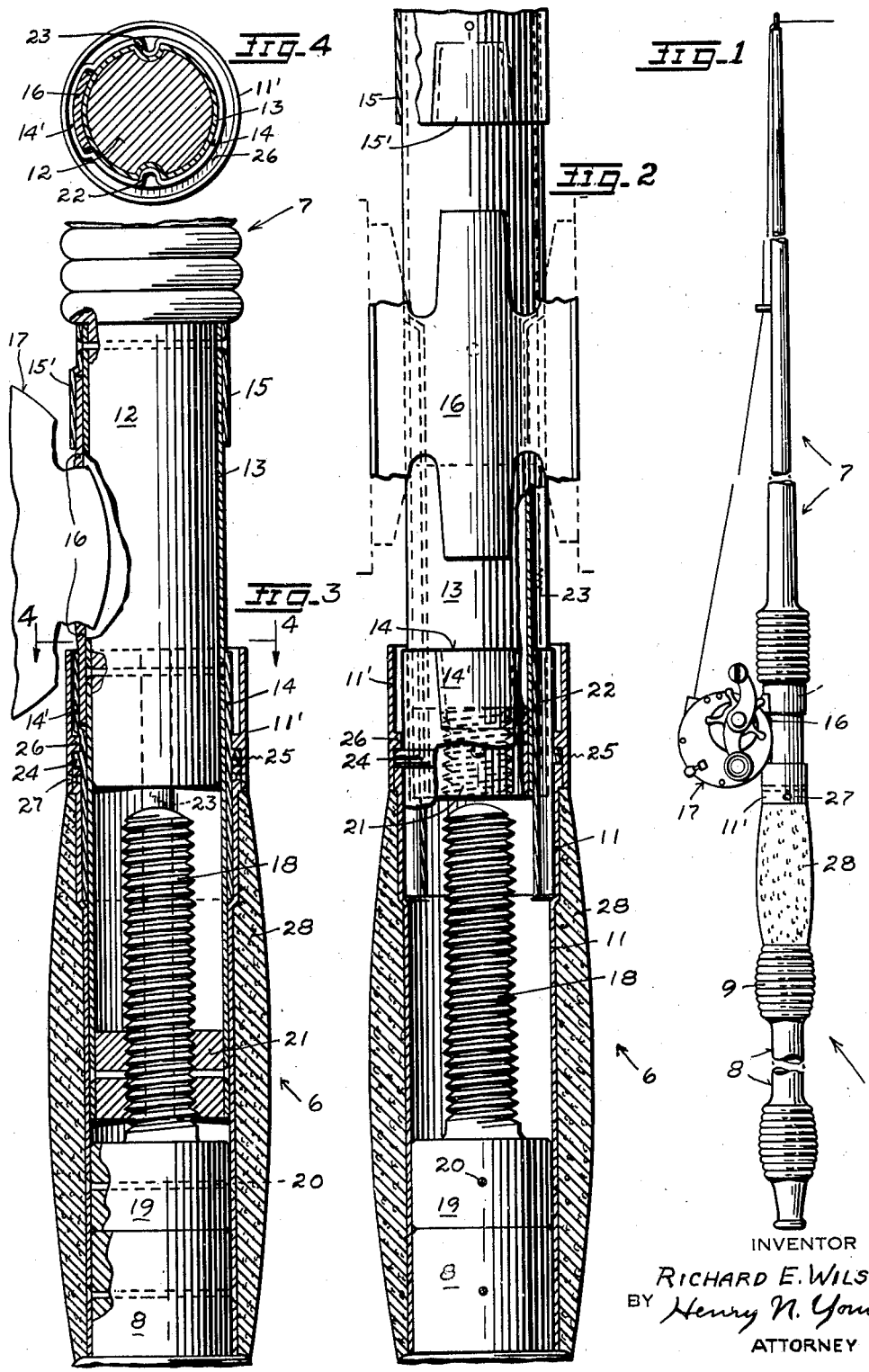

2,325,457

UNITED STATES PATENT OFFICE 2,325,457

FISHING REEL MOUNTING

Richard E. Wilson, Oakland, Calif.

Application October 31, 1941, Serial No. 417,330

7 Claims. (Cl. 43—22)

The invention relates to a means for mounting a usual line reel on a fishing rod.

An object of the invention is to provide a generally improved means for securing a reel to a fishing rod having mutually separable pole and handle sections, said means being controlled by the securing means for the sections.

Another object is to provide a reel mounting of the character described which is so constituted that the securing or release of a reel with respect to the pole assembly may be effected in a particularly positive and simple manner.

The invention possesses other objects and features of advantage, some of which, with the foregoing, will be set forth or be apparent in the following description of a typical embodiment of the invention, and in the accompanying drawing, in which, Figure 1 is a fragmentary side view of an assembled sectional fishing rod mounting a fish-line reel thereon by means of the present invention.

Figure 2 is an enlarged fragmentary axial section showing the rod sections disconnected and disposed for their connection to secure the reel base by and between the sections.

Figure 3 is a sectional view taken in an axial plane perpendicular to the view of Figure 2, and shows the reel base secured by and between the fishing rod sections.

Figure 4 is a transverse section taken at the line 4—4 in Figure 3.

As particularly illustrated, the present reel mounting means is provided with and for a fishing rod having mutually separable butt and pole sections 6 and 7 respectively. The butt section 6 comprises a handle member 8 providing spaced grips 9 and carrying a metallic sleeve 11 extending therefrom and providing, in part, the means for securing the sections together. The butt end of the usual ferrule portion 12 of the pole section 7 mounts a sleeve 13 for fitted and slidable engagement within the bore of the sleeve 11 of the butt section structure.

The sleeves 11 and 13 respectively mount bands 14 and 15 for engaging opposite ends of the usual base 16 of a reel 17; the reel base 16 comprises oppositely directed tongue-like parts of the reel frame which is fragmentarily shown in Figures 2 and 3. The bands 14 and 15 are provided with similar offset portions 14' and 15' which define pockets between them and the sleeve 13 for the simultaneous reception and wedging of the reel base ends against the sleeve 13. The band 14 is swivelled to the forward end of the sleeve 11 and the band 15 is fixedly mounted at the forward end of the sleeve 13, the pockets of the different bands being opposed when the rod sections are in axial alignment; this arrangement assures a positive separation of the bands when the reel is to be released, thereby avoiding a frequent difficulty with some present reel-mounting arrangements in which one securing band is freely slidable along the pole section which is to mount the reel.

Since the telescopic engagement of the sleeves 11 and 13 is arranged to fix the reel base 16 against the sleeve 13, means are provided for positively drawing the sleeves 11 and 13 into the telescopic relation, said means, in the present instance, comprising a bolt and nut arrangement. As particularly illustrated, a bolt 18 is secured within the forward end portion of the sleeve 11 in coaxial relation thereto, the head 19 of said bolt being cylindrical to fit the bore of the sleeve and being secured to the sleeve at or adjacent the end of the member 8 within the sleeve, as by a rivet pin 20. A nut 21 for receiving the bolt 18 is fixed within the free end of the sleeve 13 coaxially therewith, the arrangement being such that a relative rotation of the rod sections 6 and 7 about their common axis, while the bolt 18 threadedly engages the nut 21, will telescopically engage or disengage the sections as desired.

The swivelled mounting of the band 14 on the sleeve 11 is provided to permit a constant alignment of the pockets of the bands 14 and 15 axially of the rod while the rod sections are being telescopically engaged or separated by reason of action of the bolts 18 and the nuts 21 during their relative rotation, and means are preferably provided to insure the rotation of the band 14 with the rod section 7. As particularly shown, ribs 22 extend inwardly from the bore of the band 14 for sliding engagement in complementary axial grooves 23 provided in the exterior of the sleeve 13. As indicated, the ribs 22 and the grooves 23 are provided by inwardly offset integral portions of the band 14 and sleeve 13 respectively. This provision for insuring the rotation of the band 14 with the sleeve 13 insures a constant alignment of the pockets of the bands 14 and 15 to provide for the engagement of the reel base 16 longitudinally along the sleeve 13 against which it is firmly seated when the rod sections are screwed together to a degree limited by the length of the reel base.

In the present instance, the swivelled mounting of the reel-securing band 14 on the sleeve 11 is effected by the engagement of a peripheral annular flange 24 of the band 14 in a complementary groove 25 provided in the bore of the sleeve 11 inwardly of its offset 14'. To provide for the original assembly, a forward portion 11' of the sleeve 11 may be initially provided as a separate member which provides an inwardly directed annular rib 26 between which and the outer extremity of the other sleeve section the groove 25 is defined. With the flange 24 rotatably imprisoned in the groove 25, the sections of the sleeve 11 may be unitarily fixed together as by rivets 27.

Preferably, and as shown, the band 14 extends inwardly of its flange 24 within a complementarily enlarged portion of the bore of the sleeve 11 whereby the band may be restrained to a coaxial relation with the sleeve while rotatable within its outer bore portion. This arrangement facilitates the insertion of the sleeve 13 within the band 14 of the sleeve 11 during assembly of the rod, the bores of the latter band and sleeve jointly providing a uniform bore for the telescopic reception of the sleeve 13.

A protective hood may be provided about the portion of the band 14 beyond the rib 26 of the sleeve 11, whereby to prevent possible damage to the band during the transportation of the separated rod sections to and from a place of use for the rod. As particularly shown, the sleeve 11 is continued sufficiently beyond its rib 26 of the swivelled connection for the band 14 to completely enclose the band peripherally thereof, the bore of this hood extension being large enough to permit the free rotation of the band, with its offset 14', within it. It will be understood that the hood extension of the sleeve 11 in no way affects the swivelled connection of the band 14 with the sleeve 11. If desired, and as shown, a cork grip 28 may enclose the sleeve 11 between its portion 11' and the adjacent grip 9.

While I have particularly shown and described a fishing rod assembly in which the reel base is secured to and against the inner end of a pole section, it will be understood that the present assembly may be completely reversed with respect to the engaged butt and pole sections without departing from the spirit of my invention. Also, the present nut and bolt arrangement for effecting a drawing together or separation of the sections by and upon their relative rotation might alone be reversed in the present assembly without effecting the opertiveness of the reel mounting means; this reversal of parts would, however, result in the exposure of the bolt beyond the sleeve 12 to permit possible damage to the bolt threads during the handling and transportation of the separated rod sections.

From the foregoing description of my invention, taken in connection with the accompanying drawing, the advantages of the construction and use will be readily understood by those skilled in the art to which the invention appertains. While I have described the features and use of an arrangement which I now consider to be a preferred embodiment of my invention, I desire to have it understood that the showing is primarily illustrative, and that such changes may be made, when desired, as fall within the scope of the following claims.

I claim:

1. In a fishing rod having two threadedly engaged separable sections, and reel-holding members operative to clamp opposite ends of the base of a fish-line reel to the first of said sections, one of said members being fixedly mounted on said first section and the other of said members being swivelled to the second section and engaging the first rod section for rotating therewith.

2. In a fishing rod having two threadedly engaged separable sections, means on the first of said sections, said means providing a socket for axially receiving and laterally engaging an end of the base of a line reel seated along and against the section, and a reel-holding band swivelled to the second of said sections for rotation with the first rod section and cooperative with the first section to provide a socket for axially receiving and laterally engaging the other end of the seated reel base.

3. In a fishing rod, two sections having an end portion of one arranged for telescopic engagement within an end bore of the other, reel-holding members carried by the different sections and cooperative to clamp the base of a line reel to the first section by reason of the coaxial extension of said end portion of the first section within the end bore of the second section, one of said members being fixed to the first section and the other member being swivelled to the second section for its rotation with the first section, and a bolt-and-nut connection between the sections cooperative upon a relative rotation of the engaged sections to engage them for rendering the reel-holding members operative with respect to a reel base seated against the first section.

4. In a fishing rod having two threadedly engaged separable sections, reel-holding members operative to secure opposite ends of the base of a fish line reel to the first of said sections, one of said members being fixed on the first section and the other said member being swivelled to the second section, and means cooperative between the latter said member and the first section to restrain the member for rotation with the first section.

5. In a fishing rod, threadedly engaged sections having an end portion of one arranged for telescopic engagement within an end bore of the other, and reel-holding members carried by the different sections and cooperative to clamp a base of a line reel to the first section by reason of the rotation of said end portion of the first section within the end bore of the second section, one of said members being fixedly mounted on the first section and the other member being swivelled to and within the second section and being disposed entirely within the bore of the latter section.

6. In a fishing rod having two telescopically engaged separable sections arranged for relative rotation, and reel-holding members providing sockets cooperative to receive and wedgedly clamp the opposite ends of the base of a fish line reel to the first of said sections, one of said members being fixedly mounted on the first section and the other of said members comprising a band which is swivelled to the second section and which engages the first section for rotation therewith to provide a constant alignment of the sockets of the members as the sections are rotated relatively.

7. In a fishing rod having two telescopically engaged separable sections arranged for relative rotation about their axial line and having an end portion of one arranged for telescopic engagement within an end bore of the other, and reel-holding members carried by the different sections and cooperative to clamp a base of a line reel to the first section by reason of a telescopic engagement of the sections, one of said members being fixedly mounted on the first section and the other member being swivelled to and enclosed within the second section.

RICHARD E. WILSON.